United States Patent

Saeva

[11] 3,957,347
[45] May 18, 1976

[54] SELECTIVELY VARIABLE CIRCULARLY DICHROIC FILTERING METHOD

[75] Inventor: Franklin D. Saeva, Webster, N.Y.

[73] Assignee: Xerox Corporation, Stamford, Conn.

[22] Filed: Mar. 26, 1975

[21] Appl. No.: 562,304

[52] U.S. Cl.............................. 350/150; 350/160 LC
[51] Int. Cl.² ............................................ G02F 1/13
[58] Field of Search ............... 350/150, 154, 160 LC

[56] References Cited
UNITED STATES PATENTS
3,780,307  12/1973  Saeva............................. 350/150 X Primary Examiner—Edward S. Bauer
Attorney, Agent, or Firm—James J. Ralabate; Michael H. Shanahan; George J. Cannon

[57] ABSTRACT

The optical transitions of extrinsically optically active soluble and insoluble materials become circularly dichroic when in contact with twisted nematic liquid crystalline compositions. The intensity of circular dichroism induced in the normally extrinsically optically active materials in contact with twisted nematic liquid crystalline compositions having dielectric anisotropy is selectively varied by application of an electrical field. The relative amounts of right handed and left-handed circularly polarized light in elliptically polarized light is thereby selectively variably altered, including the selective production of circularly polarized light.

18 Claims, 4 Drawing Figures

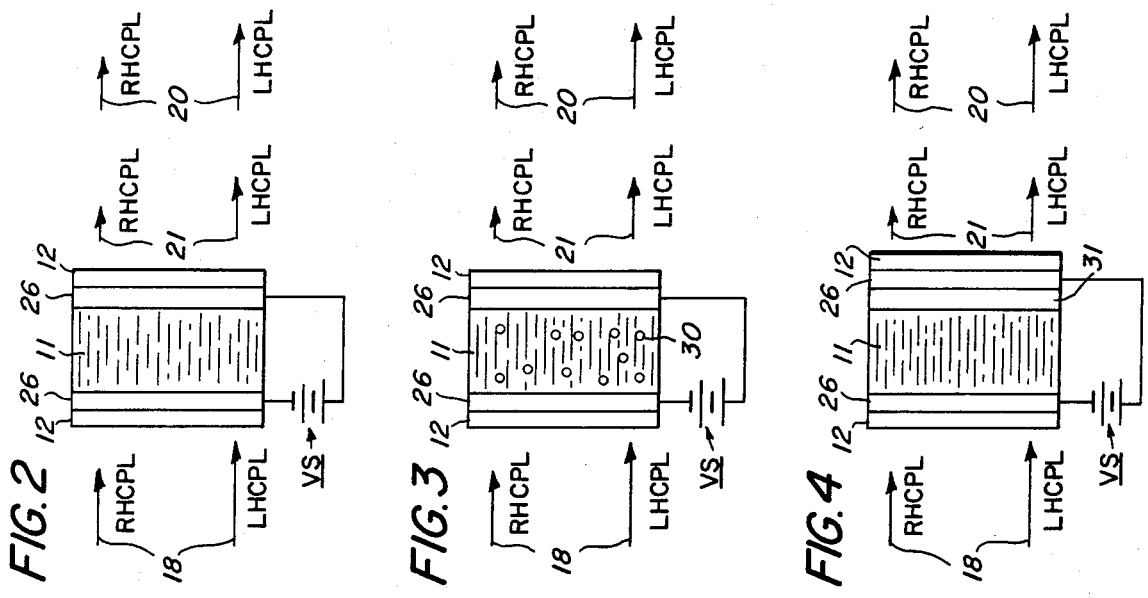
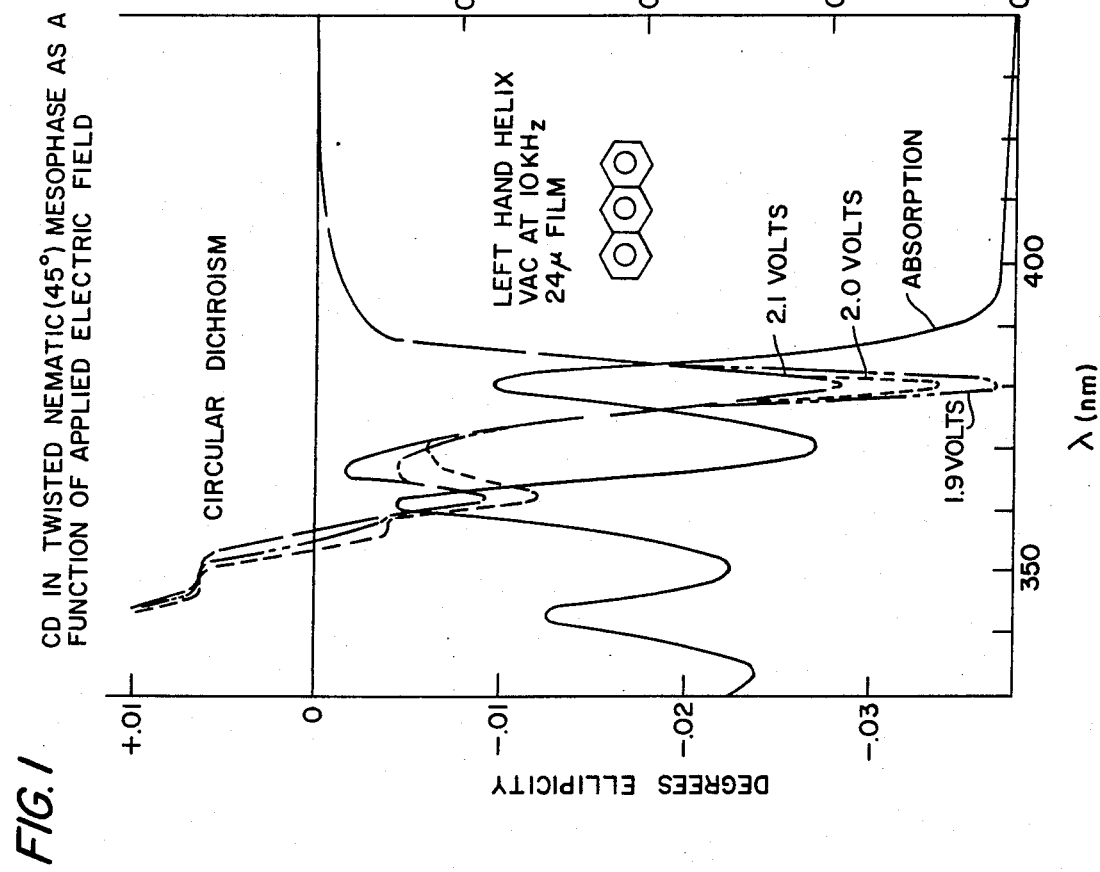

SELECTIVELY VARIABLE CIRCULARLY DICHROIC FILTERING METHOD

BACKGROUND OF THE INVENTION

This information relates to liquid crystalline materials and, particularly, to uses of the combination of the twisted nematic structure in nematic liquid crystalline materials in contact with extrinsically optically active materials. More particularly, this invention relates to a specific use of the discovery that the optically active materials display circular dichroism when in contact with the twisted nematic structure in nematic liquid crystalline materials and that application of an electrical field across the twisted nematic will alter the induced circular dichroism.

Liquid crystalline substances exhibit physical characteristics, some of which are typically associated with liquids and others of which are typically unique to solid crystals. The name "liquid crystals" has become generic to substances exhibiting these dual properties. Liquid crystals are known to appear in three different forms: the smectic, nematic, and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a manner which is unique to each of the three mesomorphic structures. Each of these three structures is well known in the liquid crystal art.

The twisted nematic structure is well known in the art. When a nematic liquid crystalline material is sandwiched between substrates treated for unidirectional homogeneous alignment, the nematic is externally perturbed into a helical structure when the rubbed surfaces are placed at some angle (other than 0°) with respect to one another. See, for example, M. Schadt and W. Helfrich, *Appl. Phys. Lett.*, 18, 127 (1971), "Voltage-Dependent Optical Activity of A Twisted Nematic Liquid Crystal".

Twisted nematic cells have been employed in display devices, particularly where electro-optic effects are modulated by the application of an electrical field across layers of nematic liquid crystalline material in the twisted nematic structure. See, for example, U.S. Pat. No. 3,731,986 to Fergason and U.S. Pat. No. 3,781,085 to Leibowitz.

The molecules of the nematic in the twisted structure of nematic liquid crystals can be thought of as arranged in very thin layers with the long axes of the molecules parallel to each other and to the local optic axes of the layers. The direction of the long axes of the molecules in each layer is displaced slightly from the corresponding direction in adjacent layers. This displacement is cumulative over successive layers to that overall displacement traces out a helical path. A comprehensive description of the optical properties of the twisted nematic structure of nematic liquid crystals is given in "Optics in Smoothly Varying Anisotropic Planar Structures: Application to Liquid-Crystal Twist Cells", D. W. Berreman, 63, *J. Opt. Soc. Am.*, 1374 (1973).

Nematic liquid crystals in the twisted structure rotate the plane of polarization of light passing therethrough an amount between 0° and 90° equal to the angular difference between the alignment dierctions of the substrates. The intrinsic sense of the helical twist can be either right-handed or left-handed.

Extremely large extrinsic circular dichroism has been observed within the electronic transitions of achiral (optically inactive) solutes dissolved in cholesteric mesophases as reported in recently issued U.S. Pat. No. 3,780,304 to F. D. Saeva et al and in the following articles by F. D. Saeva et al appearing in the *Journal of the American Chemical Society* (JACS): "Cholesteric Liquid-Crystal-Induced Circular Dichroism (LCICD) of Achiral Solutes. A Novel Spectroscopic Technique", Vol. 94, JACS, oage 5135 (1972); "Cholesteric Liquid-Crystal-Induced Circular Dichroism (LCICD). V. Some Mechanistic Aspects", Vol. 95, JACS, page 7656 (1973); "Cholesteric Liquid-Crystal-Induced Circular Dichroism (LCICD). VI. LCICD Behavior of Benzene and Some of its Mono- and Disubstituted Derivatives", Vol. 95, JACS, page 7660 (1973); and "Cholesteric Liquid-Crystal-Induced Circular Dichroism (LCICD). VII. LCID of Achiral Solutes in Lyotropic Cholesteric Mesophases", Vol. 95, JACS, page 7882 (1973).

To our knowledge, circular dichroism has not been previously reported as induced in extrinsically optically active materials in contact with the twisted nematic structure of nematic liquid crystalline materials.

It has heretofore been thought by those working in the art as evidenced by the above articles that two mechanisms contributed independently to the existence of Liquid Crystal Induced Circular Dichroism in dissolved materials: (1) helical organization of solute, and (2) the exposure of solute to a helical organization of liquid crystal molecules. My work prior to the present invention indicated that mechanism (2) could be the sole operative mechanism. Shortly after the invention described in this Application, independent data was reported which confirmed that mechanism (1) was not required for the observation of extrinsic LCICD within solutes in the cholesteric mesophase. That is, the solute molecules need not be ordered into helical organization by the mesophase in order to exhibit liquid crystal induced circular dichroism. The data is reported in "The Optical Activity of Achiral Molecules in a Cholesteric Solvent", J.C.S. Chem. Comm., page 712, 1973.

In rapidly growing areas of technology such as liquid crystals new methods, apparatus, compositions and articles of manufacture are often discovered for the application of the new technology in a new mode. The present invention relates to novel and advantageous uses of extrinsically optically active materials in contact with the twisted nematic structure of nematic liquid crystalline materials.

SUMMARY OF THE INVENTION

It is an object of the invention to provide an optical system which can be adapted to function as a variable optical filter system.

It is a further object of the invention to provide an optical filter system which can selectively, variably modify the relative amounts of right-handed and left-handed circularly polarized light components in elliptically polarized light.

The above mentioned objects and advantages and others are realized in accordance with the invention by employing between two electrodes normally extrinsically optically active materials whose electronic transitions, i.e., effect obtained from the interaction of light energy with the electrons of the molecules, become circularly dichroic (i.e., show a large preferential absorption of either left hand circularly polarized light (LHCPL) or right hand circularly polarized light (RHCPL) when in contact with the twisted nematic structure of nematic liquid crystalline materials having positive dielectric anisotropy; and applying and varying an electrical field across the twisted nematic to tilt the nematic molecules. It should be understood that by the term "extrinsically optically active materials" we mean both intrinsically optically active and intrinsically optically inactive materials which are optically active or inactive, respectively, out of contact (or when not in contact) with twisted nematic liquid crystalline substances. Both intrinsically optically active materials and optically inactive materials become extrinsically optically active when contacted with the twisted nematic structure of nematic liquid crystalline materials. This extrinsic induced behavior may overwhelm and dominate over any intrinsic activity since the specific rotations and molecular ellipticities in the former case are normally substantially larger than that observed for intrinsically optically active materials.

As used herein, "in contact" includes dissolution of soluble extrinsically optically active material as well as mere physical contact between the nematic and insoluble extrinsically optically active material.

The extrinsically optically active materials can be soluble or insoluble in the nematic liquid crystalline material and, if insoluble, can be either dispersed in the nematic or provided as a coating in contact with the nematic of positive dielectric anisotropy. Dissolution, dispersion and coating contact all meet the requirement that the extrinsically optically active material be "in contact" with the twisted nematic structure of the nematic liquid crystalline material.

"Insoluble" is used herein to mean that dissolution of the material added to or contacted by the nematic liquid crystalline material can not be detected by conventional photometric techniques, such as circular dichroism and optical absorption.

It has been found that when such extrinsically optically active materials are dissolved in or otherwise contacted by twisted nematics, the optically active materials exhibit circularly dichroic behavior within their absorption bands; and, that the intensity of exhibited circular dichroism is variable with the amount of voltage applied across the twisted nematic. The optical behavior induced in the normally extrinsically optically active materials is circular dichroism; i.e., a difference in absorption of RHCPL and LHCPL.

The invention will be more fully understood from the following detailed description of various preferred embodiments thereof particularly when read in conjunction with the accompanying drawings wherein:

FIG. 1 shows the absorption spectra of anthracene between 330 and 400 nm in the twisted nematic structure of a 1:1 weight ratio of p-cyanophenyl-p-butyl benzoate and p-cyanophenyl-p-heptylbenzoate and, the circular dichroism induced therein as a function of applied voltage.

FIG. 2 is a schematic side cross-sectional view of a first embodiment of a typical variable optical filter constructed according to the invention.

FIG. 3 is a schematic side cross-sectional view of a second embodiment variable optical filter according to the invention.

FIG. 4 is a schematic side cross-sectional view of a third embodiment variable optical filter.

Referring now to FIG. 1, there is seen the circular dichroism and absorption spectrum of an about 24 micron thick film of anthracene dissolved in a 1:1 weight ratio of p-cyanophenyl-p-butylbenzoate and p-cyanophenyl-p-heptylbenzoate. The anthracene comprises about 1 wt. % of the solution. The nematic is provided with a left handed 45° twist between the alignment directions of the top and bottom rubbed substrates. The circular dichroism induced in the 360 and 380 nm absorption bands of the anthracene is negative is sign; that is, more right handed circularly polarized light is absorbed than left handed circularly polarized light. Conversely, more left handed circularly polarized light is transmitted than right handed circularly polarized light. The intensity (degrees ellipticity) of the induced circular dichroism changes with variations in applied voltage.

In the left handed helix CD bands of negative sign ($\epsilon_R > \epsilon_L$) appear at about 360 and 380 nm while positive CD bands appear at about 340 nm. It has been found that the sign of the circular dichroism induced in the normally extrinsically optically active materials dissolved in a twisted nematic structure depends upon the polarization of the optical transition of the additive, and the pitch and sense of twist of the nematic. If the polarization of optical transition of the additive is perpendicular (that is to say, the optical transition moment is aligned perpendicular to the local optic axis of the nematic layer) then the CD sign is negative with a left-handed twisted nematic and is positive with a right handed twisted nematic. If the polarization of optical transition is parallel, then the CD sign is positive with a left-handed twisted nematic and is negative with a right handed twisted nematic.

The sign of the circular dichroism induced in insoluble extrinsically optically active materials is independent of the optical transition polarization of the material and is negative for a left hand twisted nematic and positive for a right hand twisted nematic.

The addition of extrinsically optically active materials whose absorption bands become circularly dichroic when in contact with the twisted nematic structure of a nematic liquid crystalline material between two electrodes permits a novel and highly advantageous means for selectively varying the relative amounts of right-handed and left-handed circularly polarized light components in a beam of light containing both.

The additives which can be placed in contact with twisted nematic liquid crystalline substances according to the invention can be soluble or insoluble (as previously defined) in the twisted nematic environment and should have optical transitions in some regions of the electromagnetic spectrum. Any suitable extrinsically optically active soluble or insoluble material can be used according to the invention. Typical suitable extrinsically optically active materials include, among others soluble or insoluble organic and inorganic dyes and pigments, aromatic compounds such as benzene, naphthalene, anthracene and the like; azo compounds such as arylazonaphthols, azobenzenes, etc.; nitro compounds such as nitrobenzene, nitroarylazonaphthols, and the like; nitroso compounds such as nitrosonaphthalene and the like; anil compounds such as benzylidene aniline, etc.; carbonyl compounds such as acetone, acetophenone, benzophenone and the like; thiocarbonyls such as thioacetophenones, thioacetone, thiobenzophenone, and the like; alkenes such as butadiene, cyclohexane, etc.; heterocyclics such as furans, aziridines, pyridines and the like; alkanes such as hexane, dodecane and the like; metallic complexes; dyes such as polymethin, sulfur, indigo and anthraquinone dyes; and mixtures thereof.

Typical methods of insolubilizing any of the above soluble compounds include adsorbing on suitable surfaces and converting to ionic derivatives.

Generally speaking, the use of extrinsically optically active additive materials that absorb in the visible region of the spectrum such as, for example, inorganic and organic pigments, will be preferred in applications where visible light is to be employed.

Of course, it should be recognized that the above classes of materials are intended to be only illustrative of the insoluble and soluble additives which will provide the induced circular dichroism behavior.

The amount of material which can be dissolved or dispersed in a twisted nematic structure can vary over an extremely wide range. As little as about 0.01% by weight of optically active material in the solution or dispersion can provide the induced optical activity. Of course, the upper limit of the amount of additive which can be incorporated into any particular nematic liquid crystal composition, and which can go as high as about 90% by weight, is controlled by the requirement that the total environment must retain its twisted nematic character after the addition of the optically active material (soluble or insoluble).

The nematic liquid crystalline composition having positive dielectric anisotropy can comprise any suitable nematic liquid crystalline material having positive dielectric anisotropy, or a mixture of nematic liquid crystalline materials with materials having positive dielectric anisotropy, or a mixture of positive and negative dielectric anisotropy nematics which yield a net positive dielectric anisotropy nematic composition.

Typical suitable nematic liquid crystalline materials having positive dielectric anisotropy are well known in the liquid crystalline art and need not be listed in detail herein. These include cyanoaniline compounds such as p-hexyloxybenzylidene-p'-cyanoaniline and p-heptyloxybenzylidene-p'-cyanoaniline disclosed by M. Schadt and W. Helfrich in *Appl. Phys. Lett.*, 18, 127 (1971); nematic esters such as p-cyanoaniline-p-butylbenzoate and p-cyanophenyl-p-heptylbenzoate, both available from Aldrich Chemical Company; and butyl-p, p-ethoxyphenoxycarbonylphenyl carbonate, available from Eastman Chemical Products, Inc.

Typical suitable materials having positive dielectric anisotropy include smectic liquid crystalline materials having positive dielectric anisotropy such as p-methoxybenzylidene-p'-trifluoroethylaniline and p-heptyloxybenzylidene-p'-trifluoromethylaniline. These materials can be conveniently prepared by starting with about 0.10 mole of either p-methoxybenzaldehyde or p-heptyloxybenzaldehyde, depending upon the product desired. The starting compound is refluxed with p-trifluoromethylaniline for about four hours in about 100 cc of absolute ethanol to which a trace of p-toluenesulfonic acid has been added. The water produced in the reaction is removed by azeotroping over the 95% ethanol into a Dean Stark trap. The reaction mixture is allowed to cool to room temperature and the crude product is crystallized from solution. The resulting product is recrystallized from hexane and yields about 0.06 moles of purified product. The purified p-methoxybenzylidene-p'-trifluoromethylaniline is mesomorphic from about 50° to about 87°C, and the purified p-heptyloxybenzylidene-p'-trifluoromethylaniline is mesomorphic from about 38 to about 82°C.

The positive dielectric anisotropic materials, including positive dielectric anisotropic smectics, to be added to nematic liquid crystalline materials can be added in any amount so long as the resulting composition retains the nematic mesomorphic state. Similarly, when mixtures of positive and negative dielectric anisotropic nematics are to be utilized, the amount of negative dielectric anisotropic nematic can be added in any amount so long as the resulting composition has a net positive dielectric anisotropy. Negative dielectric anisotropy nematic liquid crystalline materials are well known in the art and need not be listed in detail herein. Typical suitable negative dielectric anisotropy nematic liquid crystalline materials include N-(p-methoxybenzylidene)-p-butylaniline (MBBA); p-azoxyanisole (PAA); N-(p-ethoxybenzylidene))-p-butylaniline trans-4-butyl-$\alpha$-chloro-4'-ethorystilbene. dl-4-(2-methylhexyl)-4'-ethoxy-$\alpha$-chloro-trans-stilbene; pp'-methoxypentyltolane, ethoxybenzylidene-p'-aminophenyl-3-methyl valerate, and trans-4-butyl--chloro-4'ethoxystilbene.

Mixtures of liquid crystals can be prepared in organic solvents such as chloroform, petroleum ether and others which are typically evaporated from the mixture leaving the liquid crystal composition. Alternatively, the individual components of the liquid crystalline mixture can be combined directly be heating the mixed components above the isotropic transition temperature.

The above lists of typical suitable nematic liquid crystalline substances having positive dielectric anisotropy are intended to encompass mixtures of the above. These lists are intended to be representative of the above. These lists are intended to be representative only and are not to be construed as being exhaustive or limiting the invention to the specific materials mentioned. Although any nematic liquid crystalline material having positive dielectric anisotropy and provided in the twisted nematic structure is suitable for use in the present invention, it should be recognized that various different nematic liquid crystal substances will only possess the necessary properties which make them suitable for use according to the invention at some specific temperature range which may be at room temperature or substantially below or above room temperature. However, all of the various substances, mixtures, or combinations thereof will function according to the method at some temperature. Typically, the materials of the invention will be used at or near room temperature. Thus, it it preferred to employ liquid crystal substances which have a liquid crystal state at or near room temperature. Generally speaking, the liquid crystal substances will preferably be in the liquid crystal state at the desired operational temperature.

Typical suitable thickness of films or layers of nematic liquid crystalline materials are from about 0.5 to about 50 microns, although any thickness which will provide the desired effect can be used.

The twisted nematic structure is provided by sandwiching the positive dielectrically anisotropic nematic liquid crystalline material between two electrodes treated to impart unidirectional homogeneous alignment wherein the homogeneous alignment direction of one substrate makes an angle between 0° and 90° with the homogeneous alignment direction of the other substrate.

The electrodes may be treated by any technique suitable for providing homogeneous alignment of the nematic liquid crystalline material. Typical suitable techniques include the Chatelain technique of unidirectional rubbing as disclosed in P. Chatelain, *Bull. Soc. Franc. Min. Crist.*, 66, 105 (1943); providing a coating of aligning agent in contact with layer 4 of nematic liquid crystalline material such as, for example, one of the homogeneous aligning agents listed in Vol. 61, No. 7, *Proceedings of the IEEE*, p. 823, July, 1973 in the article "Surface Produced Alignment of Liquid Crystals" by Kahn, Taylor and Schonhorn; and the so-called Janning Technique described by J. L. Janning in *Appl. Phys. Letts.*, 21, 173 (1972).

Typical suitable electrodes include conductive coatings on insulating substrates such as NESA glass available from Pittsburgh Plate Glass Company. Other suitable conductive coatings for use in insulating substrates include aluminum, copper, silver, gold, tin oxide, chromium, indium, indium oxide and others.

The nematic liquid crystalline material is provided in the twisted nematic structure by about 0° to about 90° angular displacement between alignment directions of the treated electrodes. The Chatelain and other surface treatments for homogeneous alignment can be employed. The electrodes can be treated for the same direction alignment and one rotated or twisted from about 0° to about 90° with respect to the other to provide the angular displacement, or one electrode can be treated at an angle with respect to the treatment for the other electrode in order to provide the angular displacement. The direction of angular displacement determines the chirality or sense of twist of the twisted nematic structure. The standard used herein is the direction going from the bottom electrode to the top electrode within about 0° to about 90°. If the direction from the bottom electrode alignment direction to the top electrode alignment direction within 0° to 90° is counterclockwise then the chirality of the helix is left-handed. If the direction from the bottom electrode alignment direction to the top electrode alignment direction within about 0° to about 90° is clockwise then the chirality of the helix is right-handed.

The electrodes may be of any shape and the homogeneous alignment treatment may employ aligning agents and angular film deposition (Janning Technique). Further, the electrodes may both be treated to have the same alignment direction and the top electrode is then twisted or rotated to form an angle of from about 0° to about 90° with the other. A clockwise rotation of the top with respect to the bottom results in a right-handed sense of twist. A counterclockwise rotation of the top with respect to the bottom results in a left-handed sense of twist.

Once the chirality of sense of twist is established, it remains the same for when the cell is flipped over so that the former bottom electrode is now the top electrode. This can be easily visualized by crossing two pencils and viewing them from opposite sides.

At exactly 0° or no angular displacement there is homogeneous alignment of the nematic layers (all pointing in one direction). At exactly 90° angular displacement the chirality of the twisted nematic structure generally includes a predominance of one handedness with the presence of the other handedness. Exactly 0° and 90° are therefor not preferred in utilizing the twisted nematic structure and at 90° there is nonuniformity of chirality.

EXAMPLE

A nematic liquid crystalline composition is prepared by mixing one part of weight p-cyanophenyl-p-butyl-benzoate (available from Aldrich Chemical Co., catalog number 18-032-7) and one part by weight p-cyanophenyl-p-heptyl benzoate (available from Aldrich Chemical Co., catalog number 18-031-9). Anthracene, an extrinsically optically active material is dissolved in the nematic composition in an amount comprising about one percent by weight of the total solution.

A sandwich member is formed by placing the nematic-additive solution between two indium oxide coated quartz substrates treated by the Chatelain rubbing technique. Both indium oxide coatings are rubbed uniformly in the same direction and, after the nematic-additive solution is placed on the layer of solution and rotated counterclockwise about 45°. The nematic structure with a left handed helix.

The absorption spectrum of the anthracene additive is analyzed with a Carey 15 Spectrophotometer. The analysis is shown in FIG. 1.

The sandwich member is placed in a Carey b 61 Spectropolarimeter operating in circularly dichroic mode, is electrically connected to a variable source of A.C. voltage and the absorption spectrum of the anthracene additive is analyzedd for circular dichroism at 1.9, 2.0, and 2.1 volts A.C. at 10 KHz. Circular dichroism is exhibited within the optical transitions of the anthracene molecules and varies in intensity as a function of the applied voltage. The observed circular dichroism is shown in FIG. 1. The voltage is set at about 50 volts A.C. at 10 KHz and the circular dichroism is extinguished. The nematic is transformed from the twisted nematic structure to the homeotropic, uniaxial nematic texture.

The voltage applied can be either D.C. or A.C. When the nematics employed contain ionic impurities, A.C. fields are preferably utilized at a frequency sufficient to prevent ion movement; i.e., dynamic scattering. The amount, magnitude or level of voltage applied is above the tilt threshold discussed in 63, *J. Opt. Soc. Am.*, 1374 (1973), previously cited, and below the threshold level where transition to the homeotropic uniaxial nematic texture and extinction of circular dichroism occurs.

Referring now to FIG. 2 for a first embodiment of the invention, there is seen between electrodes comprising conductive coatings 26 on insulating layer 12 a layer 11 of nematic liquid crystalline material containing a dissolved extrinsically optically active additive having an absorption band which includes the wavelength of incident radiation 18. A variable voltage source VS is electrically connected to coatings 12 and supplies a voltage therebetween. Radiation 18 is elliptically polarized light containing unequal amounts of RHCPL (right-handed circularly polarized light) and LHCPL (left-handed circularly polarized light). The nematic in layer 11 is in the twisted nematic structure with a left hand sense of twist or chirality. At a first voltage across electrodes emerging radiation 20 is less intense than incident radiation 18 and contains a different ratio of unequal amounts of RHCPL and LHCPL. The ellipticity of the ellipitcally polarized light has been changed. The circular dichroism induced in the additive at any given voltage between tilt threshold and uniaxial texture theshold will change the relative amounts of RHCPL and LHCPL as shown for light 20. At a second voltage across electrodes 12 the emerging radiation 21 contains relative amounts of RHCPL and LHCPL that is different from that of radiation 20.

FIG. 3 schematically depicts a second embodiment of the invention. Nematic liquid crystalline film 11 having particles 30 of insoluble extrinsically optically active additive dispersed therein is contained between coatings 12. In order to take advantage of the circular dichroism induced in the particles 30, incident light radiation 18 should, of course, have wavelengths within the absorption band of the insoluble additive particles 30.

The selectively variable optical filter, generally speaking, is utilized for selectively altering the relative amounts of RHCPL and LHCPL components in incident elliptically polarized radiation. In the present invention, any number of nematic liquid crystal films to which an extrinsically optically active soluble or insoluble material has been added can be used to alter the relative amounts of circularly polarized components. Also, a single film of a nematic liquid crystalline composition itself containing any number of extrinsically optically active soluble or insoluble materials may be utilized.

FIG. 4 schematically illustrates a third embodiment of the invention wherein the extrinsically optically active additive is an insoluble linearly dichroic coating 31 in contact with a nematic liquid crystalline film. The insoluble material need only be in intimate contact with the liquid crystalline material. Any of the aforementioned insoluble materials may be used and may be coated upon one of the coatings 12. Any suitable method of forming a coating of insoluble material may be used. For example, sublimation by heating the insoluble material in a vacuum can be employed. The insoluble coating is then treated to produce alignment, preferably by Chatelain rubbing, in order to effect the twisted nematic structure as previously described while remaining in contact with the nematic.

While the invention has been described in detail with respect to various preferred embodiments thereof, it is not intended to be limited thereto but rather it will be appreciated by those skilled in the art that modifications and variations are possible which are within the spirit of the invention and the scope of the claims.

For example, one of right handed and left-handed circularly polarized light components in elliptically polarized light can be completely absorbed as a result of the circular dichroism induced within the absorption band of the extrinsically optically active material. When this occurs only the other handedness of circularly polarized light is in the emergent beam of light; that is, the emergent beam is now circularly polarized light. The selective production of circularly polarized light from elliptically polarized light, in addition to the selective alteration of elliptically polarized light, is intended herein to be included in the phrase "selectively altering the relative amounts of right-handed and left-handed circularly polarized light components in elliptically polarized light".

What is claimed is:

1. A method of selectively varying the relative amounts of right-handed and left-handed circularly polarized light components in elliptically polarized light having a wavelength within a region of interest, comprising:
    a. providing, between two electrodes, an optical filter comprising a positive dielectrically anisotropic nematic liquid crystalline composition in the twisted nematic structure and in contact with an extrinsically optically active material having an absorption band defining said region of interest.
    b. applying, between said two electrodes, a voltage level below the threshold value for transition of said nematic from the twisted nematic structure to the homeotropic uniaxial texture and above the tilt threshold for the twisted nematic structure of said nematic liquid crystalline composition; and
    c. directing an elliptically polarized light beam comprising right hand circularly polarized light and left hand circularly polarized light at a wavelength within said region of interest through said optical filter.

2. The method of claim 1 further including the step of
    d. varying the applied voltage to a second level below the threshold value for transition of said nematic from the twisted nematic structure to the homeotropic, uniaxial texture and above the tilt threshold for the twisted nematic structure of said nematic liquid crystalline composition.

3. The method according to claim 2 wherein said first voltage level is less than said second voltage level.

4. The method according to claim 2 wherein said first voltage level is greater than said second voltage level.

5. The method of claim 2 wherein said elliptically polarized light directed through said optical filter emerges as circularly polarized light at one of applied voltage and second level voltage.

6. The method of claim 1 wherein said extrinsically optically active material is soluble in said nematic liquid crystalline composition.

7. The method of claim 6 wherein said extrinsically optically active material comprises from about 0.01% to about 90% by weight of the resulting solution.

8. The method of claim 1 wherein said extrinsically optically active material is insoluble in said nematic liquid crystalline composition.

9. The method of claim 8 wherein said extrinsically optically active material is dispersed in said nematic liquid crystalline composition.

10. The method of claim 9 wherein said extrinsically optically active material comprises from about 0.01% to about 90% by weight of the resulting dispersion.

11. The method of claim 8 wherein said extrinsically optically active material is provided in layer configuration.

12. The method of claim 1 wherein said nematic liquid crystalline composition comprises a mixture of p-cyanophenyl-p-butyl benzoate and p-cyanophenyl-p-heptyl benzoate.

13. The method of claim 1 wherein said nematic liquid crystalline composition comprises a smectic liquid crystalline material having positive dielectric anisotropy.

14. The method of claim 1 wherein said nematic liquid crystalline composition comprises a mixture of nematic liquid crystalline materials of positive and negative dielectric anisotropy, said composition having a net positive dielectric anisotropy.

15. The method of claim 1 wherein said extrinsically optically active material comprises a member selected from the groups consisting of: aromatic, azo, nitro, anil, carbonyl, and thiocarbonyl compounds; alkenes; alkanes; heterocyclic compounds and mixtures thereof.

16. The method of claim 15 wherein said extrinsically optically active material has an absorption band in the visible region of the electromagnetic spectrum.

17. The method of claim 15 wherein said extrinsically optically active material is selected from the group consisting of anthracene and methylene blue.

18. The method of claim 1 wherein said elliptically polarized light directed through said optical filter emerges as circularly polarized light.

* * * * *